(12) United States Patent
Ganick et al.

(10) Patent No.: US 11,611,860 B2
(45) Date of Patent: Mar. 21, 2023

(54) DYNAMIC BLUETOOTH BROADCAST OF DATA

(71) Applicant: Preddio Technologies Inc., North Andover, MA (US)

(72) Inventors: Aaron Ganick, Boxford, MA (US); Scott Kelly, Manchester, NH (US); Vijaykumar Soni, Westford, MA (US)

(73) Assignee: Preddio Technologies Inc., North Andover, MA (US)

( * ) Notice: Subject to any disclaimer, the term of this patent is extended or adjusted under 35 U.S.C. 154(b) by 0 days.

(21) Appl. No.: 17/066,032

(22) Filed: Oct. 8, 2020

(65) Prior Publication Data

US 2021/0112392 A1   Apr. 15, 2021

Related U.S. Application Data

(60) Provisional application No. 62/915,320, filed on Oct. 15, 2019.

(51) Int. Cl.
  *H04W 4/80*   (2018.01)
  *H04W 76/14*  (2018.01)
  *H04W 4/06*   (2009.01)
(52) U.S. Cl.
  CPC ............. *H04W 4/80* (2018.02); *H04W 4/06* (2013.01); *H04W 76/14* (2018.02)
(58) Field of Classification Search
  CPC ..................... H04W 84/18; H04L 12/2838
  See application file for complete search history.

(56) References Cited

U.S. PATENT DOCUMENTS

| 8,712,330 B2 | 4/2014 | Desai et al. |
| 9,008,917 B2 | 4/2015 | Gautama et al. |
| 9,763,029 B2 | 9/2017 | Mirza et al. |

(Continued)

OTHER PUBLICATIONS

International Search Report and Written Opinion of the International Searching Authority from related PCT application PCT/US2020/054783.

(Continued)

*Primary Examiner* — Cindy Trandai
(74) *Attorney, Agent, or Firm* — Husch Blackwell LLP

(57) ABSTRACT

A method and system for dynamically broadcasting device data using a standard Bluetooth Low Energy (BLE) advertisement packet is provided. Specifically, the Bluetooth advertisement packet can be Bluetooth 4.0 compatible that has a maximum payload size of 31 bytes excluding MAC address. The Bluetooth advertisement packet can be modified to include one or more data corresponding to one or more parameters gathered or detected by one or more sensors. The parameters can include acceleration, velocity, temperature, pressure, and the like. A BLE device employing the data schemes disclosed herein can further be configured to broadcast multiple advertisement packets each containing different data corresponding to different parameters. Thus, expending the payload capacity of advertisement packets without having to initiate pairing between a remote device and the BLE device and maintains backward compatibility without requiring the remote device to be advertising extensions (Bluetooth 5.0) compatible.

19 Claims, 5 Drawing Sheets

(56) References Cited

U.S. PATENT DOCUMENTS

| | | |
|---|---|---|
| 10,172,169 B2 | 1/2019 | Lee et al. |
| 10,321,293 B2 | 6/2019 | Jackson et al. |
| 2013/0003630 A1* | 1/2013 | Xhafa ............... H04W 52/0229 |
| | | 370/311 |
| 2014/0155031 A1* | 6/2014 | Lee ....................... H04W 12/08 |
| | | 455/411 |
| 2014/0357192 A1 | 12/2014 | Azogui et al. |
| 2015/0099467 A1 | 4/2015 | Kang |
| 2015/0281877 A1* | 10/2015 | Walden .................. H04W 4/80 |
| | | 455/41.2 |
| 2016/0157048 A1 | 6/2016 | Kerai et al. |
| 2016/0307154 A1 | 10/2016 | Moore et al. |
| 2017/0064491 A1* | 3/2017 | Mirza ................... H04L 43/106 |
| 2017/0272270 A1* | 9/2017 | Gu .......................... H04W 4/80 |
| 2017/0347245 A1 | 11/2017 | Kumar |
| 2020/0036792 A1 | 1/2020 | Palin et al. |

OTHER PUBLICATIONS

Argenox "Designing Ble Advertising Packets" https://www.argenox.com/library/bluetooth-low-energy/designing-ble-advertising-packets/; date accessed Oct. 15, 2020.

Katsandres, Jim. Bluetooth Blog. "Bluetooth Low Energy—It Starts with Advertising" Feb. 15, 2017 https://www.bluetooth.com/blog/bluetooth-low-energy-it-starts-with-advertising/.

Specification of the Bluetooth System, Specification Version 4.2, vol. 0. Master Table of Contents & Compliance Requirements; Published Dec. 2, 2014. 2772 pages.

\* cited by examiner

FIG. 4

| Even Packet | | | |
|---|---|---|---|
| Data | | Type | Length |
| 0x02 | 411 | Length | 1 byte |
| 0x01 | 412 | AD Type (Flags) | 1 byte |
| 0x06 | 413 | Flags | 1 byte |
| 0x09 | 421 | Length | 1 byte |
| 0x08 | 422 | AD type - Shortened local name | 1 byte |
| 0x0000000000000000 | 423 | Device Name | 8 bytes |
| 0x13 | 431 | Length | 1 byte |
| 0xFF | 432 | AD data - Manufacturer Specific Data | 1 byte |
| 0xC107 | 433 | Company ID | 2 bytes |
| 0x04 | 434 | Data Format | 1 byte |
| 0x00000000 | 435 | Unique ID | 4 bytes |
| 0x0000 | 436 | Vibration X velocity peak | 2 bytes |
| 0x0000 | | Vibration Y velocity peak | 2 bytes |
| 0x0000 | | Vibration Z velocity peak | 2 bytes |
| 0x00 | | Vibration X acceleration peak | 1 byte |
| 0x00 | | Vibration Y acceleration peak | 1 byte |
| 0x00 | | Vibration Z acceleration peak | 1 byte |

1st element 410: rows 411–413
2nd element 420: rows 421–423
3nd element 430: rows 431–436

FIG. 5

Odd Packet

| | Data | Type | Length |
|---|---|---|---|
| 511 | 0x02 | Length | 1 byte |
| 512 | 0x01 | AD Type (Flags) | 1 byte |
| 513 | 0x06 | Flags | 1 byte |
| 521 | 0x09 | Length | 1 byte |
| 522 | 0x08 | AD type - Shortened local name | 1 byte |
| 523 | 0x000000000000000 | Device Name | 8 bytes |
| 531 | 0x0F | Length | 1 byte |
| 532 | 0xFF | AD data - Manufacturer Specific Data | 1 byte |
| 533 | 0xC107 | Company ID | 2 bytes |
| 534 | 0x03 | Data Format | 1 byte |
| 535 | 0x00000000 | Unique ID | 4 bytes |
| 536 | 0x0000 | Alarm Status | 2 bytes |
| | 0x00 | Battery level | 1 byte |
| | 0x00 | Process Temperature | 1 byte |
| | 0x0000 | Process Pressure | 2 bytes |
| | 0x00 | Surface Temperature | 1 byte |

1st element 510: rows 511–513
2nd element 520: rows 521–523
3nd element 530: rows 531–536

DYNAMIC BLUETOOTH BROADCAST OF DATA

CROSS-REFERENCE TO RELATED APPLICATION

This application claims the benefit of the filing date of U.S. Provisional Application Ser. No. 62/915,320 filed Oct. 15, 2019, entitled, "Dynamic Bluetooth Broadcast of Data" which is hereby incorporated by reference as if fully set forth herein.

BRIEF SUMMARY OF THE INVENTION

This disclosure generally relates to broadcasting data using Bluetooth wireless standard. Specifically, this disclosure relates to broadcasting data using Bluetooth Low Energy. In particular, this disclosure relates to modifying an advertisement section within a Bluetooth protocol in order dynamically broadcast data.

BACKGROUND OF THE INVENTION

Various communication protocols exist for modern devices that form an Internet-of-Things (IoT), some of which include WiFi, Bluetooth, and Z-Wave.

Bluetooth Low Energy (BLE) or Bluetooth Smart is a newer technology that has been integrated to Bluetooth protocol since Bluetooth 4.0. In contrast to Classic Bluetooth, BLE is intended to provide reduce power consumption and cost while maintaining a similar communication range.

Devices that are not directed plugged into a power source have limited battery capacities, limiting the amount of power consuming functions that a particular device can perform before needing to replace or recharge its battery. Thus, power management and low power consumption are especially crucial for IoT devices that are typically battery powered.

Although BLE is already able to provide reduce power consumption as opposed to classic Bluetooth, it is not without flaws. In a typical BLE protocol, connection between two Bluetooth-enabled devices is a two-step process. First, a BLE peripheral device broadcasts within its broadcasting range an advertisement. The point of an advertisement is to notify Bluetooth-enabled devices (such as a mobile phone or a computer) within the proximity of the peripheral device that the peripheral device is available to communicate.

Next, if a Bluetooth-enabled device desires to communicate with the peripheral device, a connection can be established, whereby the peripheral device can transmit additional data to the Bluetooth-enabled device as appropriate.

Packet size of an advertisement packet is technically limited to 37 bytes in Bluetooth 4.0. However, an advertisement address (Bluetooth MAC Address) requires 6 bytes. Thus, actual payload size available in an advertisement packet is 31 bytes. As can be appreciated, 31 bytes is typically too small for substantive data transmission. The advertisement packet is meant for advertising to nearby devices what the broadcasting device is and what kind of services that broadcasting device can provide. Thereafter, addition information and data can be transmitted from the peripheral device upon a scan request from a requesting device or upon a successful connection. However, responding to a scan request or pairing with another device increases power consumption. Thus, there is a need to be able to transfer substantive information without having to first pair with a Bluetooth-enabled device.

Bluetooth 5.0 provides a functionality known as "advertising extensions" that extends the data size of a single advertisement packet from 37 bytes (as in Bluetooth 4.0) up to 255 bytes. However, such functionality is not backward compatible, meaning older devices that do not support Bluetooth 5.0 cannot discover extended advertisements. Thus, there is a need to utilize existing 31 bytes architecture to transmit substantive information without having to upgrade legacy devices to be Bluetooth 5.0 compatible.

In contrast to a typical Bluetooth device, a beacon is a special subset of BLE devices that is limited in functionalities. Specifically, a beacon uses only advertising mode to broadcast data to all the devices within its range. There is no ability to connect with a beacon. That is to say a beacon can only transmit data but not receive data. Further, the information broadcasted from a beacon is usually predetermined. For example, a beacon is typically configured to broadcast its own ID. A Bluetooth-enabled device in proximity of the beacon would receive this beacon ID and can recognize the received beacon ID by connecting to an online database. Once the Bluetooth-enabled device recognize the received beacon ID, it can be determined that the Bluetooth-enabled device is physically near the beacon, thus additional functionalities can be transmitted from an online server to the Bluetooth-enabled device such as location positioning or targeted marketing. In this sense, a beacon essentially functions as a location marker. It can only transmit data unilaterally without being paired for further configurations or communications. Thus, a beacon is generally not suitable for complex functionalities provided by a traditional Bluetooth device.

BRIEF DESCRIPTION OF THE DRAWINGS

FIG. 4 illustrates a first detailed scheme of an advertisement packet according to an exemplary embodiment.

FIG. 5 illustrates a second detailed scheme of an advertisement packet according to an exemplary embodiment.

Figure 1:
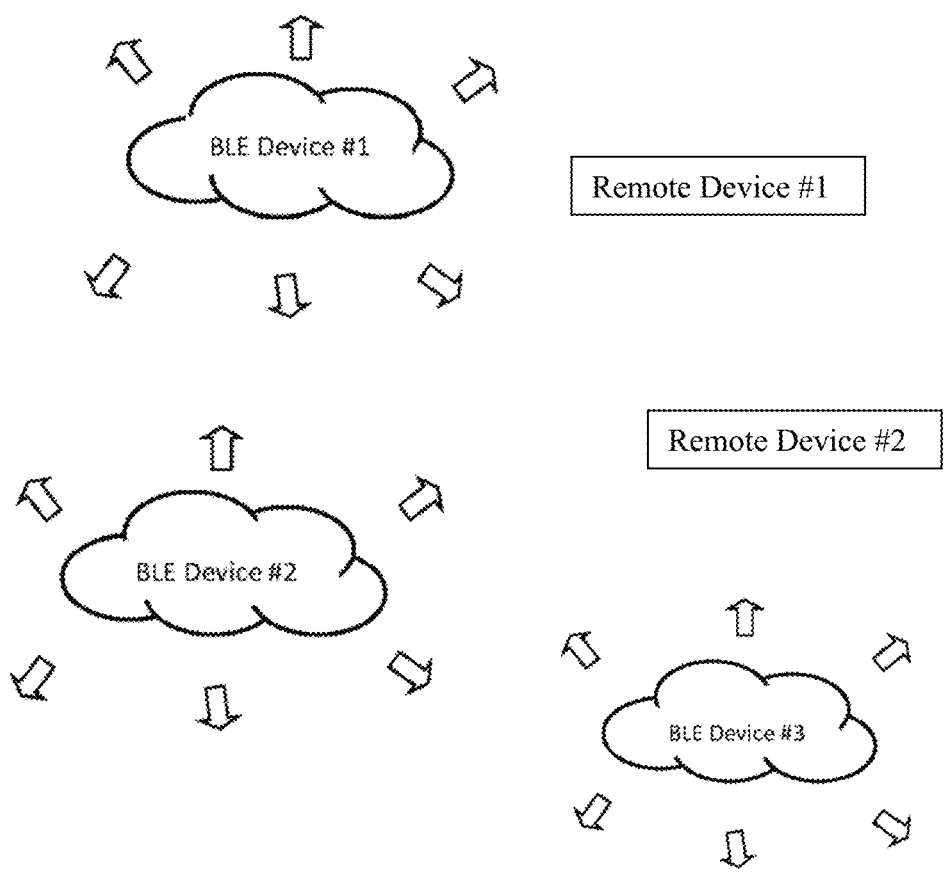
FIG. 1 illustrates a system of Bluetooth-enabled devices according to an exemplary embodiment.

Before explaining the disclosed embodiment of the present invention in detail, it is to be understood that the invention is not limited in its application to the details of the particular arrangement shown, since the invention is capable of other embodiments. Exemplary embodiments are illustrated in the referenced figures of the drawings. It is intended that the embodiments and figures disclosed herein are to be considered illustrative rather than limiting. Also, the terminology used herein is for the purpose of description and not of limitation.

DETAILED DESCRIPTION

Although this invention is susceptible of embodiments in many different forms, there are shown in the drawings and are described in detail herein specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in desired combinations, for the operation of the invention in its various embodiments. Features from one embodiment can be used in other embodiments of the invention.

Referring to FIG. 1, a system of Bluetooth-enabled devices is shown. Specifically, BLE devices are Bluetooth 4.0 compatible devices that are capable of both an advertising mode and a connection mode. That is to say, these are non-beacon devices that broadcast advertisement packets periodically until a remote device requests to make a connection. Then, BLE devices can be connected or paired with one or more remote devices as appropriate. However, the system can also comprise one or more beacon devices, any number of BLE devices, and any number of remote devices.

In a master/slave scheme, a remote device or a master device can be a mobile phone, a tablet, a computer, or other Bluetooth-enabled devices. Whereas a BLE device or a slave device can be a sensor, a smart watch, a Bluetooth headset, or the like. Although Bluetooth protocol allows master and slave relationship to be switched, for the ease of understanding, for ease of reference herein, it is to be understood that master devices refer to devices such as Bluetooth-enabled mobile phones and computers, whereas slave devices refer to devices such as sensors.

Figures 2, 3:
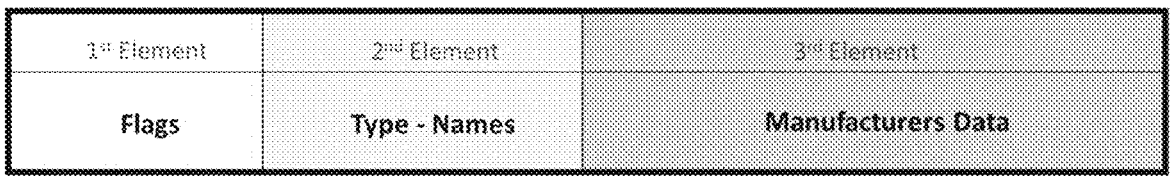
FIG. 2 illustrates a 31-byte advertisement packet (excluding MAC address) according to an exemplary embodiment.
FIG. 3 illustrates an exemplary scheme for dynamically broadcasting data using the advertisement packet shown in FIG. 2.

In advertising mode, each of the BLE device periodically broadcasts a Bluetooth 4.0 compatible advertisement packet, i.e. a 31 bytes packet and a 6 bytes MAC address, totaling 37 bytes. An exemplary advertisement packet is shown in FIG. 2. As shown in FIG. 2, an advertisement packet can be defined into three elements. A first element for flags, a second element for type and names, and a third element for manufacturer data (Manufacturer-Specific Data).

FIG. 3 illustrates each of the elements aforementioned in more details according to an exemplary embodiment. The first element can contain the flags that are standardized and defined in various Bluetooth standard documents. The second and the third element can be customized to enable dynamic broadcasting of Bluetooth data.

Specifically, the second element can be modified to rename a device while maintaining a unique ID. In addition, the third element can be modified to provide the unique ID and associated dynamic data in a compressed format as shown in FIG. 3, thereby enabling maximum data amounts of data transfer. The unique ID can be a unique number assigned during the manufacturing of BLE devices so that every BLE device manufactured has a different unique ID. In addition, the advertisement packet can be enhanced with the notion of 'odd' and 'even' packets which contain different information. This additional information allows scalability of the amount of data that can be reliably transmitted.

FIG. 4 illustrates as a scheme of a dynamic data according to an exemplary embodiment. The first element 410 can comprise a first length 411, a first AD type 412—corresponding to a flags, and flags 413, each accounting for one byte of data. The second element 420 can comprise a second length 421, a second AD type 422—corresponding to a shortened local name, and a device name 423, with the second length 421 and the second AD type 422 each accounting for one byte of data, and the shorten device name 423 accounting for eight bytes of data. The third element 430 can comprise a third length 431, a third AD data 432—corresponding to a manufacturer specific data, a company ID 433, a data format 434, a unique ID 435, as well as allocations for data being broadcasted 436. As shown in FIG. 4, the third length 431, the third AD data 432, and the data format 434 can each account for one byte of data; the company ID 433 can account for two bytes of data, and the unique ID 435 can account for four bytes of data. Following the scheme sets for in FIG. 4, up to nine bytes can be used to broadcast dynamic data within a 31 bytes advertisement packet (not account for MAC address).

By way of example, according to an embodiment, a BLE device can be a sensor that is configured to broadcast data according to the scheme set forth herein. For the purpose of illustration, the sensor can be configured to detect vibration, velocity, acceleration, battery level, temperature, pressure, as well as additional parameters as appropriate.

Referring back to FIG. 4, when the sensor is configured to broadcast data based on the scheme described, two bytes each can be allocated for axis x, y, and z vibration velocity peaks, and one byte each can be allocated for axis x, y, and z vibration acceleration peaks. As can be appreciated, these remaining bytes can be used to broadcast other types of substantive data collected by the sensor. That is to say, these bytes are not limited to only broadcasting vibration related data, instead, the remaining nine bytes can be used to broadcast one or more types of sensor data that combined take up to nine-bytes. For example, the remaining nine bytes can be used to broadcast a first sensor data that is nine-bytes long. The remaining nine bytes can also be used to broadcast a second and a third sensor data that are four bytes each, or four and five bytes each, or any other possible combinations as appropriate. In yet another example, the remaining nine-bytes can be used to broadcast nine different types of sensor data, each accounting for one byte.

Further still, the unique ID need not be fixed at four bytes. In an embodiment, the unique ID can be less than four bytes such as three bites, thus allowing up to ten bytes of sensor data. In yet another embodiment, the unique ID can be more than four bytes such as five bytes, thus allowing up to eight bytes of sensor data. That is to say, the length of the unique ID and the length of bytes available for sensor data can be adjusted as necessary. Put simply, up to 13 bytes can be made available for the unique ID and the sensor data. Other modifications to the advertisement packet can also be used, such as eliminating certain elements altogether.

In addition, odd and even schemes can be employed to broadcast data containing different substantive information. Continuing the example from above, the sensor can gather additional parameters not already broadcasted in the advertisement packet shown in FIG. 4. Thus, an additional advertisement packet can be broadcasted as shown in FIG. 5. For the purpose of simplicity, the advertisement packet according to FIG. 4 is herein referred to as an even packet (or a first packet), and the advertisement packet according to FIG. 5 is herein referred to as an odd packet (or a second packet).

Referring to FIG. 5, the first 22 bytes of the odd packet are generally the same as the even packet of FIG. 4. That is to say, the odd packet also comprises a first element 510, a second element 520, and a third element 530. Again, the first element 510 can comprise a first length 511, a first AD type 412—corresponding to a flags, and flags 513, each accounting for one byte of data. The second element 520 can comprise a second length 521, a second AD type 522—corresponding to a shortened local name, and a device name 523, with the second length 521 and the second AD type 522 each accounting for one byte of data, and the shorten device name 523 accounting for eight bytes of data. The third element 530 can comprise a third length 531, a third AD data 532—corresponding to a manufacturer specific data, a company ID 533, a data format 534, a unique ID 535, as well as allocations for data being broadcasted 536.

Unlike the even packet however, the odd packet can comprise other substantive information gathered by the sensor that are not already broadcasted within the even packet. By way of example, according to an embodiment, the odd packet can comprise alarm status (accounting for two bytes), battery level, process temperature, and surface temperature, each accounting for one byte, and process pressure accounting for two bytes of data. As can be appreciated, in this example, the total packet size is only 29 bytes, meaning two additional bytes is available for use in a 31 bytes advertisement packet.

The switch between broadcasting even packet and broadcasting odd packet can be based on advertising interval of the sensor or the broadcasting device where the two packets can be alternatively broadcasted. For example, the sensor can be configured to broadcast the even packet at time t, and the odd packet at time t+1. Thereafter, the even packet can be broadcasted at t+2 and the odd packet can again be broadcasted at t+3 and so forth. The advertising interval can be determined based on a desired battery life of the broadcasting device, as shorter interval translates into shorter battery life. In an embodiment, the advertising internal can be between 100 milliseconds (ms) to 1000 ms.

Since the packets alternate based on the advertising interval, this eliminates the need of the BLE device to wait for a scan request to transmit additional information. That is to say, the BLE device can be configured to alternate broadcasting an even packet and an odd packet without the need to wait for a scan request from a remote device and without using a scan response packet.

Although only two advertisement packets are described— an odd packet and an even packet—additional advertisement packets can also be dynamically broadcasted using similar schemes. For example, a BLE device can be configured to broadcast a first advertisement packet, a second advertisement packet, and a third advertisement packet, each comprising different parameters gathered by a sensor.

Figure 6:
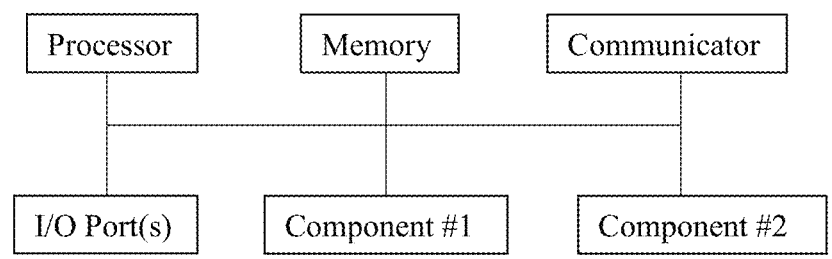
FIG. 6 illustrates a BLE device according to an exemplary embodiment.

The data being transmitted using the schemes described herein need not all be gathered by a single sensor. In an embodiment, as shown in FIG. 6, a BLE device 600 can comprise one or more components. The components can be sensors such as accelerometers, speedometers, pressure gauges, current sensors, voltage sensors, temperature gauges, motion detectors, proximity sensors, hall effect sensors, light sensors, or any other types of sensors. In addition, the components can be a light, where data being transmitted according to the schemes can be whether the light is on or off or its brightness level. The components can also be various types of switches such as those used in a control system or in manufacturing plants. Certainly, the components can also be devices from residential settings in addition to industrial settings. The principal in applying the schemes is generally similar, where the data being transmitted can correspond to a status of one or more components (such as one light on or all lights on), a parameter of one or more components (such as a brightness of a lightbulb), or a parameter detected or gathered by one or more components (such as temperature, pressure, accelerations).

Specifically, the BLE device 600 utilizing the schemes described herein can comprise a processor being coupled to a memory and a Bluetooth-enabled communicator. The communicator can be a two-way transceiver or other Bluetooth-enable communication modules known in the art. The processor can further be coupled to one or more components as aforementioned. Software or algorisms stored on the memory can cause the processor to encode and to generate advertisement packets comprising data from one or more components according to the dynamic broadcasting schemes and broadcasts the advertisement packets via the communicator. Certainly, the BLE device 600 can comprise additional modules such as an input/output (I/O) port, a battery or other types or power supply, or other modules as applicable.

Moreover, the dynamic data being broadcasted via advertisement packets need not all come from a same BLE device. For example, in a mesh network setup having a plurality of BLE devices, gathered information from a first BLE device can be transmitted to a second BLE device, where the second BLE device can then broadcast advertisement packets comprising information gathered by the first BLE device as well as information gathered by the second BLE device using the schemes aforementioned.

A remote device can be configured to receive advertisement packet(s) broadcasted from one or more BLE devices. An application or a software installed on the remote device can be used to interpret the advertisement packets received. Alternatively or in addition, the remote device can be configured to forward the received advertisement packets to one or more servers for further processing.

In some embodiments, a BLE device is capable of two-way communication instead of unitary transmitting information. The remote device can be configured to paired with one or more BLE devices, enabling the remote device to monitor and/or configure each of the paired BLE devices. This is known as a connection mode or a communication mode as opposed to advertisement mode where a pairing request can be transmitted and a connection can be created.

For example, if a BLE device is a sensor, a remote device such as a mobile phone or a computer can be paired with the sensor to adjust the sensor's functionalities. In an embodiment, one of the functionalities that can be adjusted can be the parameters being broadcasted in one or more advertisement packets by the sensor. Likewise, an advertisement interval can be another functionality adjustable after being paired with the remote device.

In short, a BLE device can be configured to broadcast data gathered by the BLE device via one or more advertisement packets according to the schemes described herein. Thereafter, when desired, a remote device can be paired the BLE device to perform additional functions such as to retrieve historical data gathered or to configure the BLE device.

Specific embodiments of a method and system for dynamic Bluetooth broadcasting of data according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. The subject disclosure is understood to encompass the present invention and any and all modifications, variations, or equivalents that fall within the spirit and scope of the basic underlying principles disclosed and claimed herein.

What is claimed is:

1. A method for dynamically broadcasting data comprising:

gathering a first parameter, a second parameter, a third parameter, and a fourth parameter, wherein the first parameter, the second parameter, the third parameter, and the fourth parameter are each a value detected by a one of a plurality of physical sensors within a single device that corresponds to an environmental parameter external to the single device;

generating a first Bluetooth advertisement packet comprising the first parameter and the second parameter;

generating a second Bluetooth advertisement packet comprising the third parameter and the fourth parameter; and transmitting alternatively the first Bluetooth advertisement packet and the second Bluetooth advertisement packet according to an advertising interval.

2. The method of claim 1, wherein the first Bluetooth advertisement packet and the second Bluetooth advertisement packet each comprises a maximum of 31-bytes usable for payloads.

3. The method of claim 1, wherein the first Bluetooth advertisement packet and the second Bluetooth advertisement packet are both Bluetooth 4.0 compatible.

4. The method of claim 1, wherein the first parameter is different from the second parameter.

5. The method of claim 1, wherein the first Bluetooth advertisement packet comprises a first element for manufacturer specific data, the first parameter is contained within the first element; and the second Bluetooth advertisement packet comprises a second element for manufacturer specific data, the third parameter is contained within the second element.

6. The method of claim 5, wherein the first element for manufacturer specific data further comprises the second parameter, and the second element for manufacturer specific data further comprises the fourth parameter.

7. The method of claim 6, wherein the first parameter, the second parameter, the third parameter, the fourth parameter each corresponds to at least one of an acceleration, a velocity, a temperature, or a pressure.

8. A method for dynamically broadcasting data comprising:

detecting, by a BLE device, a first parameter and a second parameter, wherein the first parameter and the second parameter are each a value detected by one of a plurality of physical sensors within the BLE device that corresponds to an environmental parameter external to the BLE device;

generating a first Bluetooth advertisement packet comprising the first parameter and the second parameter;

transmitting the first Bluetooth advertisement packet;

detecting, by the BLE device, a third parameter, wherein the third parameter is a third value detected by one of the plurality of physical sensors within the BLE device that corresponds to an environmental parameter external to the BLE device;

generating a second Bluetooth advertisement packet comprising the third parameter;

transmitting the second Bluetooth advertisement packet;

receiving a pairing request from a remote device; and in response to receiving the pairing request, establishing a pairing connection between the BLE device and the remote device, wherein the first Bluetooth advertisement packet and the second Bluetooth advertisement packet are alternatively transmitted according to an advertising interval.

9. The method of claim 8, wherein the first Bluetooth advertisement packet comprises a maximum of 31-bytes usable for payloads.

10. The method of claim 8, wherein the first Bluetooth advertisement packet is Bluetooth 4.0 compatible.

11. The method of claim 8, wherein the first parameter corresponds to at least one of an acceleration, a velocity, a temperature, or a pressure.

12. The method of claim 8, wherein the first Bluetooth advertisement packet comprises a first element for manufacturer specific data, the first parameter is contained within the first element.

13. The method of claim 12, wherein the first Bluetooth advertisement packet further comprises a second element for flags and a third element for shortened local name, wherein the second element accounts for 3 bytes, the third element accounts for 10 bytes, and the first element accounts for a maximum of 18 bytes.

14. The method of claim 8, wherein the first parameter is different from the second parameter.

15. A device comprising:

a first physical sensor and a second physical sensor coupled to a Bluetooth-enabled communicator; and the Bluetooth-enabled communicator is configured to alternatively transmit a first Bluetooth advertisement packet including a first parameter detected by the first physical sensor and a second Bluetooth advertisement packet including a second parameter detected by the second physical sensor according to an advertising interval, wherein the first parameter is a first value detected by the first physical sensor and the second parameter is a second value detected by the second physical sensor, wherein the first value and the second value each corresponds to an environmental parameter external to the first physical sensor or the second physical sensor respectively, and wherein the first physical sensor, the second physical sensor, and the Bluetooth-enabled communicator are contained in the device.

16. The device of claim 15, wherein the first Bluetooth advertisement packet and the second Bluetooth advertisement packet each comprises a maximum of 31-bytes usable for payloads.

17. The device of claim 15, wherein the first Bluetooth advertisement packet and the second Bluetooth advertisement packet are both Bluetooth 4.0 compatible.

18. The device of claim 15, wherein the first parameter and, the second parameter each corresponds to at least one of an acceleration, a velocity, a temperature, or a pressure.

19. The device of claim 18, wherein the first parameter is different from the second parameter.

* * * * *